US012473764B2

(12) United States Patent
Pfeuti et al.

(10) Patent No.: US 12,473,764 B2
(45) Date of Patent: Nov. 18, 2025

(54) SUSPENSION ASSEMBLY FOR A SLIDING DOOR

(71) Applicant: Gilgen Door Systems AG, Schwarzenburg (CH)

(72) Inventors: Andreas Pfeuti, Riffenmatt (CH); Yanick Bapst, Rechthalten (CH)

(73) Assignee: Gilgen Door Systems AG, Schwarzenburg (CH)

(*) Notice: Subject to any disclaimer, the term of this patent is extended or adjusted under 35 U.S.C. 154(b) by 0 days.

(21) Appl. No.: 18/719,532

(22) PCT Filed: Jul. 11, 2022

(86) PCT No.: PCT/EP2022/069253
§ 371 (c)(1),
(2) Date: Jun. 13, 2024

(87) PCT Pub. No.: WO2023/110169
PCT Pub. Date: Jun. 22, 2023

(65) Prior Publication Data

US 2025/0067102 A1 Feb. 27, 2025

(30) Foreign Application Priority Data

Dec. 14, 2021 (CH) ................................ 70713/2021

(51) Int. Cl.
*E05D 15/06* (2006.01)
*E05F 15/643* (2015.01)

(52) U.S. Cl.
CPC ....... *E05D 15/063* (2013.01); *E05D 15/0626* (2013.01); *E05D 15/0652* (2013.01); *E05F 15/643* (2015.01); *E05Y 2201/684* (2013.01)

(58) Field of Classification Search
CPC ... E05D 15/063; E05D 15/06; E05D 15/0617; E05D 15/0621; E05D 15/0626; E05D 15/0652; E05Y 2201/684; E05F 15/643
See application file for complete search history.

(56) References Cited

U.S. PATENT DOCUMENTS 4,404,770 A * 9/1983 Markus .................. E05F 5/003 49/235
4,452,014 A * 6/1984 Markus ................ E05F 15/646 49/210

(Continued)

FOREIGN PATENT DOCUMENTS

DE 10 2004 013 352 A1 10/2005
DE 10 2006 030 395 B3 10/2007

(Continued)

OTHER PUBLICATIONS

DE102004013352 English Translation (Year: n/a).*

(Continued)

*Primary Examiner* — Justin B Rephann
(74) *Attorney, Agent, or Firm* — Sughrue Mion, PLLC

(57) ABSTRACT

A suspension assembly (2) for a door leaf (3) of a sliding door (1), having a suspension part (4) and an attachable component part (5). The suspension part (4) is used to movably suspend the door leaf. The component part (5) is used to hold a drive motor (61) and/or other components. The suspension part has upper and lower support elements (47, 48), and the component part has a hanging element (52), by which the component part can be hung on the suspension part such that the hanging element (52) is supported at the bottom by the lower support element (47) in a first support point (S1) and at the top by the upper support element (48) in a second support point (S2). The first support point is (Continued)

arranged between the second support point and the center of gravity (SP) of the component part.

19 Claims, 6 Drawing Sheets

(56) References Cited

U.S. PATENT DOCUMENTS

| | | | | | |
|---|---|---|---|---|---|
| 4,680,828 | A * | 7/1987 | Cook | E05D 15/1021 | 16/102 |
| 5,566,505 | A * | 10/1996 | Kamezaki | E05D 15/1021 | 49/225 |
| 5,987,817 | A * | 11/1999 | Hein | E06B 3/906 | 49/40 |
| 8,904,712 | B2 * | 12/2014 | Gosling | E06B 1/526 | 49/427 |
| 10,066,667 | B2 * | 9/2018 | Herchenreder | F16C 29/063 | |
| 10,626,648 | B2 * | 4/2020 | Sakabe | E06B 3/4645 | |

FOREIGN PATENT DOCUMENTS

| | | | |
|---|---|---|---|
| DE | 10 2007 041 360 | A1 | 6/2008 |
| EP | 0 822 310 | A2 | 2/1998 |
| EP | 3 176 354 | A1 | 6/2017 |
| ES | 2 401 861 | A1 | 4/2013 |
| WO | 99/40284 | A1 | 8/1999 |

OTHER PUBLICATIONS

DE102006030395 English Translation (Year: n/a).*

International Search Report for PCT/EP2022/069253, dated Oct. 11, 2022.

* cited by examiner

SUSPENSION ASSEMBLY FOR A SLIDING DOOR

CROSS REFERENCE TO RELATED APPLICATIONS

This application is a National Stage of International Application No. PCT/EP2022/069253 filed Jul. 11, 2022, claiming priority based on Switzerland Patent Application No. 70713/2021 filed Dec. 14, 2021.

TECHNICAL FIELD

The present invention relates to a suspension assembly for at least one door leaf of a sliding door, to a sliding door having a suspension assembly of this type, and to a method for assembling a sliding door having a suspension assembly.

PRIOR ART

Sliding doors having at least one, often two, displaceable door leaves have been known for a long time. The door leaf, or door leaves, herein can in most cases be displaced perpendicularly to a passage direction in such a manner that a passage, for example through a wall opening of a building, can be released or closed, respectively. Known in particular are also automatic sliding doors in which the door leaf, or door leaves, do not have to be manually displaced for opening and closing, this instead being performed by a drive motor. A presence sensor can in each case be provided on both sides of the sliding door, so as to initiate automatic opening of the sliding door as soon as a person approaches the latter.

In most of the sliding doors in use today, the door leaf, or door leaves, is/are in each case attached to a suspension part in the form of a profiled rail, for example, which is firmly fixed to the wall above the wall opening and which serves to hang the door leaf, or door leaves. In order to enable displacing of the door leaf, or door leaves, the suspension part usually has a horizontal running surface that extends along the wall, the door leaf bearing on said running surface by way of one or a plurality of carriages. The carriage, or carriages, herein is/are typically attached to the upper closing edge of the door leaf. The door leaf is able to be moved along the running surface in an opening and/or closing direction with the aid of rollers attached to the carriage. Guiding means for achieving a guided displacement of the door leaf are in most instances provided on the lower closing edge of the door leaf. The guiding means can be, for example, a guide block which is attached to the door leaf and protrudes into a guide rail provided in the floor.

In this way, the suspension part forms the connection between the sliding leaf, or sliding leaves, and the wall. Should the sliding door be an automatic sliding door, the latter additionally has a drive motor which is typically disposed so as to be stationary in the region of the upper closing edge and connected to the carriage, or carriages, by way of a revolving belt, for example, in order to drive said carriage, or carriages. For fastening the drive motor and/or further functional components such as, for example, the control unit, sliding doors in most instances have a component part which is attached to the wall or to the suspension part above the door leaf, or door leaves. In order to simplify assembling and production, the component part is often attached to the suspension part in the prior art.

A common integral design of the suspension part and the component part, in which a profile forms the suspension part as well as the component part, for example, is typically disadvantageous in particular in terms of assembling. The installation to be anchored on the wall becomes heavier as a result. Moreover, owing to its additional space requirement, the component part makes it more difficult to hang the sliding leaf, or else compromises have to be made in the design embodiment of the component part with a view to hanging the sliding leaf. A two-part embodiment of the suspension part and the component part moreover has the advantage that the assembly can be modular as a result, this potentially enabling, for example, the retro-fitting of a drive motor to a previously manually operated sliding door.

Owing to the available space and in order to enable a simple connection between the drive belt and the carriage, or carriages, the component part in many sliding doors is disposed and designed in such a manner that the drive motor, which is held on said component part, and also the further components come to lie on the outside of the carriage, or carriages. This means that the carriage, or carriages, in this instance are disposed between the wall and the drive motor.

For example, a profile suspension for a sliding door is shown in ES 2 401 861 A1, in which a roller bears on the running surface of the first profile, and a linear motor is disposed in the region of a second profile. The second profile is attached to the first profile by way of a connecting element.

DE 10 2007 041 360 A1 discloses a suspension assembly having a base profile which is fastened to the wall, and to which a further profile is screwed, the latter forming the running surface for the carriage of the sliding leaf, on the one hand, and serving to receive a linear drive, on the other hand.

Disclosed in EP 3 176 354 A1 is a sliding door assembly in which a support profile, which establishes the connection to the wall, forms a running surface for the roller of a carriage. A component part which supports the drive motor is screwed to the support profile.

Disclosed in WO 99/40284 A1 is a three-part profile for mounting the carriage and further components of a sliding door assembly. A so-called transom profile serves as a connection to the wall, and as a bearing surface for a roller of the carriage. A support roller which is attached to the carriage is likewise supported on the transom profile. A closure profile is latched to the transom profile, said closure profile in turn having a finishing profile attached to it. The three profile parts form an interior which serves to receive a motor and further components. The motor herein is fastened to the transom profile by way of a holding plate.

The suspension assemblies for sliding door leaves of the prior art are comparatively complex in terms of production and in particular assembling. Attaching the component part with the drive motor and the further components often turns out to be difficult and laborious for the technicians, owing in particular to the position above the door leaf.

Assembling is additionally impeded if counterpressure elements such as, for example, a counter roller, are provided on the carriage, said counterpressure elements serving for supporting the door leaf toward the top so as to prevent that the door leaf pivots in the direction of passage. In this instance, the door leaf with the carriage, or carriages, has to be incorporated into the suspension part exactly and with a small margin for maneuver, which is challenging for the technicians in view of the usually heavy weight of the door leaf.

SUMMARY OF THE INVENTION

It is an object of the present invention to specify a suspension assembly for at least one door leaf of a sliding door, which is simple in terms of production and assembling.

Indicators pertaining to locations and directions, such as top, bottom, vertical, horizontal, upward, downward, etc. hereunder refer in each case to the sliding door, and in particular to the suspension assembly, which is assembled on a wall according to the intended use. In this instance, the suspension assembly is usually disposed above the door leaf, or door leaves, in terms of the direction of gravity.

In order to achieve this object, the present invention makes available a suspension assembly for at least one door leaf of a sliding door, comprising

- a suspension part which comprises a running surface and serves to suspend the at least one door leaf in such a manner that the door leaf with a carriage attached thereto bears on the running surface and conjointly with said carriage is displaceable so as to roll or slide along the running surface; and
- a component part which is attached or attachable to the suspension part and serves to hold a drive motor and/or other components.

The suspension part comprises at least one lower support element and at least one upper support element. The component part comprises at least one hanging element by way of which the component part is able to be hung on the suspension part in such a manner that the hanging element is supported toward the bottom by the lower support element in a first support point and toward the top by the upper support element in a second support point, wherein the first support point is disposed so as to be spaced apart between the second support point and the center of gravity of the component part including the components attached to the latter.

In that the component part is able to be hung on the suspension part as stated above, assembling the sliding door, and in particular the suspension assembly, is significantly simplified. The technician can first fasten the suspension part to a wall, then hang the door leaf, or door leaves, on said suspension part, and finally hang the component part, preferably including the components attached thereto, on the suspension part. Owing to the lower and the upper support element, and the fact that the hanging element is supported in both support points, hanging can be performed in a particularly simple way and in such a manner that the component part is held directly in its position on the suspension part according to the intended use. The technician does not have to carry the weight of the component part and simultaneously, for example, establish a threaded connection between the component part and the suspension part in the process; instead, the component part can simply be hung on the suspension part. For safety reasons, the component part can finally in addition be secured on the suspension part by a securing element.

Assembling is also simplified for the technician because the component part having the drive motor attached thereto and/or the further components does not yet have to be attached to the suspension part when hanging the door leaf on the suspension part. As a result, the space for hanging the door leaf, or door leaves, on the suspension part is less restricted.

The suspension part serves to connect, and in particular hang, the door leaf, or door leaves, on a wall. A wall in this context is understood to be a stationary component, for example of a building. The wall portion herein, to which the suspension part is fastened, typically delimits a passage opening which is to be closed or released by the sliding door, i.e. in particular by the door leaf, or door leaves, as the case may be. For fastening the suspension part to the wall, said suspension part can have corresponding fastening means such as bores, for example. However, fastening the suspension part to the wall can also be performed indirectly, for example by way of an assembly rail anchored in the wall.

The running surface preferably points upward, i.e. in the direction extending counter to gravity, so that the carriage attached to the door leaf can bear on the running surface. The weight of the door leaf is thus at least partially absorbed, preferably to the extent of at least 50%, more preferably to the extent of at least 75%, most preferably to the extent of at least 90%, by the suspension part by way of the running surface. The remaining weight of the door leaf can be absorbed, for example, by way of the floor, in particular by way of a guide rail provided in the floor. One or a plurality of carriages, preferably however exactly two carriages, can be attached to the door leaf, said carriages bearing on the running surface. In order to enable optimal guiding of the carriage, or carriages, the running surface is preferably curved upward or downward, i.e. is designed to be convex or concave. In this instance, the carriage preferably has one or a plurality of running elements which have in each case a shape complementary thereto, i.e. are designed to be concave or convex. The running element or running elements is/are preferably rollers. The displacement of the door leaf can be performed with particularly little friction and noise in this way. It is of course also possible that the running element, or running elements, is/are designed as sliding elements, and that the carriage correspondingly slides over the running surface when displaced.

The component part serves to attach in particular electrical and/or mechanical components to the suspension assembly. The components can in particular be components of the powertrain and/or of the door control unit. The components of the powertrain can in particular be the drive motor which serves to automatically displace the door leaf, or door leaves, along the running surface. Alternatively or additionally, the components attached to the component part can be components of the powertrain or else a gearbox, a drive wheel and/or a force-transmitting element such as a drive belt. The control unit attached to the component part can comprise, for example, a mains supply unit, a computer unit, a storage unit, one or a plurality of sensors, a travel detection unit and/or a transmission unit for communicating wirelessly or by wire with an external device. Arbitrary other functional units which are required for operating the door, or doors, or otherwise necessary functional units such as, for example, a locking device for locking the door leaf, or door leaves, in the closed state, or a Bowden cable for manual emergency unlocking, can also be attached to the component part. For this purpose, the component part preferably has corresponding mounting elements such as, for example, bores, rearward engagement elements, assembly rails, etc.

The component part per se can form a cover for the components received therein, or therebehind, or can have connecting structures so as to enable a covering element, for example in the form of a sheet-metal cover plate, to be attached.

The component part is preferably designed to support at least 50% of the weight of the drive motor and/or of the other components. More preferably, the component part is even designed to support at least 75%, most preferably even 100%, of the weight of the drive motor and/or of the other components. The component part is moreover preferably designed so that the drive motor and/or the other components are in each case attached to the lower side of the component part.

In a particularly preferred embodiment, the lower and the upper support element are in each case formed by a projection that protrudes from the suspension part toward the component part. The hanging element, which is preferably formed by a projection protruding from the component part toward the suspension part, can in this instance be advantageously inserted simply between the lower and the upper support element so as to hang the component part on the suspension part.

The supporting action of the hanging element by way of the two support points can be considered a physical lever to the extent that the first support point forms a fulcrum about which the component part by way of its hanging element is rotatable. The weight of the component part including the components attached to the latter effects a rotational force which is however inhibited on the opposite side of the fulcrum by the upper support element in the second support point. This means that the weight on the component side is absorbed by the upper support element, as a result of which a force equilibrium is established and the component part is in a stable position.

The first support point is preferably disposed so as to be spaced apart from the second support point as well as from the center of gravity of the component part. More preferably, the first support point is in each case disposed so as to be spaced apart in the horizontal direction from the second support point as well as from the center of gravity of the component part. The center of gravity is defined by the weight distribution of the component part including the components attached to the latter, thus of the drive motor and/or the other components.

In a particularly preferred embodiment, the suspension part is designed as a profiled rail. The latter can in particular be designed to be integral in its entirety. The material of the suspension part is preferably a metal, optionally a plastics material. The metal can be aluminum, for example.

The component part is preferably also designed as a profiled rail. The component part can in particular also be designed to be integral in its entirety. The material of the component part is likewise preferably a metal, optionally a plastics material. Here too, the metal can be aluminum, for example.

Producing the suspension part and/or the component part as a profiled rail is particularly simple and cost-effective. Moreover, comparatively lightweight profiled rails can be produced.

The upper support element and preferably also the lower support element are preferably disposed above the running surface when the suspension assembly is assembled according to the intended use. As a result, the component part can be hung on the suspension part above the running surface. As a result, the displacement path along the running surface can be kept clear for the door leaf, or door leaves.

In order to prevent pivoting of the door leaf hung on the suspension part along the direction of passage, one or a plurality of counterpressure elements are advantageously attached to said door leaf. The counterpressure element, or counterpressure elements, can in particular be provided on the carriage. The counterpressure element, or counterpressure elements, can in particular be counterpressure rollers which preferably roll on a counter running surface provided on the suspension assembly when displacing the door leaf. The counter running surface thus serves to bear a counterpressure element attached to the door leaf, in particular a counterpressure roller attached to the door leaf.

In certain embodiments, this counter running surface can be formed by the component part. This entails the advantage that hanging the door leaf on the suspension part is significantly simplified because only the running element, or running elements, of the carriage have to be positioned on the running surface for this purpose, without the correct positioning of the counterpressure elements on the counter running surface having to be additionally and simultaneously taken into account. As a result, the door leaf can in particular also be hung on the suspension part in a slightly inclined position, i.e. a position pivoted along the direction of passage. Once the door leaf has been hung, the latter can then be vertically aligned, unless said door leaf performs this per se on account of gravity. The counterpressure element, or counterpressure elements, then preferably come into contact with the counter running surface when the component part is hung.

In other embodiments, the counter running surface can however alternatively also be formed by the suspension part. This has the advantage that noise emissions during the operation of the sliding door can be reduced as a result.

The counter running surface is preferably disposed between the first support point and the center of gravity of the component part. In an arrangement of the counter running surface of this type, the latter will typically come to bear automatically on the counterpressure element, or counterpressure elements, when hanging the component part. Assembling is further facilitated as a result.

When the suspension assembly is assembled according to the intended use, the suspension part by way of the lower support element does not extend as far, or extends at most as far, outward in the direction of the component part as by way of the running surface.

In the case of a suspension assembly assembled according to the intended use, when the suspension part by way of the lower support element does not extend as far, or extends at most as far, outward in the direction of the component part as by way of the running surface, hanging the door leaf on the suspension part is particularly simple for the technician: when attaching the door leaf to the suspension part, for example by means of placing the carriage, or carriages, on the running surface of the suspension part, the lower support element cannot get in the way of, or can get in the way of only to a significantly reduced degree, the door leaf and components optionally attached thereto. The space above the running surface on that side of the suspension part that faces the component part to be attached is in this instance typically clear, and hanging the door leaf on the suspension part is particularly simple. Even the space directly below the running surface is also clear, as the case may be.

In this instance, when the suspension assembly is assembled according to the intended use, the suspension part by way of the lower support element extends as far outward in the direction of the component part as by way of the running surface when the outermost end of the lower support element extends as far outward in the direction of the component part, thus usually in the horizontal direction toward the outside, as the running surface by way of its outer periphery that faces the component part. Parts of the suspension part that do not contribute toward absorbing the load arising in the first support point when the suspension assembly is assembled according to the intended use are typically not considered as being associated with the lower support element. When the suspension assembly is assembled according to the intended use, the suspension part by way of the lower support element thus in particular does not extend as far, or at most extends as far, outward in the direction of the component part up to the first support point as by way of the running surface.

The suspension assembly moreover preferably comprises a securing element for securing the component part on the suspension part. The securing element can be, for example, one or a plurality of screws which are for example screwed through the component part into the suspension part, or are fastened to the latter by means of a nut so as to prevent removal of the component part from the suspension part, e.g. due to an external mechanical influence.

In a particularly preferred embodiment, the securing element is however at least one bracing element which is disposed between the suspension part and the component part and is designed to mutually brace the suspension part and the component part. The bracing element can thus in particular be clamped between two mutually opposite faces of the suspension part and of the component part, for example, so that said parts are pushed away from one another by the bracing element. This advantageously leads to the suspension part and the component part in turn being pressed together at another location, preferably in the region of the hanging element, and as a result being mutually braced in such a manner that a stronger connection between the suspension part and the component part is created. The use of a bracing part disposed between the suspension part and the component part enables particularly simple fastening of the component part to the suspension part.

For the purpose of bracing the two components, the bracing element is preferably disposed on that side of the suspension part and of the component part that faces the at least one door leaf, thus typically on the lower side. Once the component part has been hung on the suspension part, bracing can be performed in a particularly simple manner as a result by virtue of the good accessibility of the bracing element.

The bracing element preferably comprises at least one eccentrically running face which, by means of rotating the bracing element, is able to be pressed increasingly against the suspension part and/or against the component part. The eccentrically running face enables particularly simple yet efficient bracing. The bracing element advantageously has a first eccentrically running face which, by means of rotating the bracing element, is able to be pressed increasingly against the suspension part, and a second eccentrically running face which, by means of rotating the bracing element in the same direction, is able to be pressed increasingly against the component part.

In order to facilitate the rotation of the bracing element with the aid of a tool, said bracing element can have an engagement structure such as, for example, an Allen key or Torx structure.

The bracing element by means of rotation is preferably able to be pressed simultaneously against the suspension part and against the component part. As a result, bracing can be performed particularly efficiently.

In a particularly preferred embodiment, the bracing element is a groove block which is held in a groove of the suspension part and/or in a groove of the component part. The at least one groove is preferably sized in such a manner that the groove block is insertable into the latter with little effort in terms of force, but upon insertion is securely held in the groove even when said groove block does not yet mutually brace the suspension part and the component part.

The component part is hung on the suspension part in a particularly stable manner when the second support point, in the case of a suspension assembly assembled according to the intended use, is disposed at the same height as, or below, the first support point.

Hanging the component part is particular simple for the technician when the lower support element, in the case of a suspension assembly assembled according to the intended use, extends so as to be slightly inclined upward in the direction of the component part. For hanging the component part, the technician can in this instance simply allow the hanging element to slide along the upper side of the lower support element, which simplifies assembling.

The hanging element and the upper support element preferably form in each case a hook, these two hooks being designed to hook into one another so as to secure the connection between the suspension part and the component part in the case of a suspension assembly assembled according to the intended use. As a result of the mutual hooking, it can be prevented that the component part falls off the suspension part, for example due to an inadvertent mechanical influence.

The present invention moreover relates to a sliding door having at least one door leaf and a suspension assembly, designed according to the above embodiments, for hanging the door leaf on a wall.

The invention furthermore relates to a method for assembling a sliding door with a suspension assembly, wherein the suspension assembly can particularly and preferably be designed as set forth above. The suspension assembly comprises at least one suspension part having a running face and a component part, and the method comprises at least the following steps:

attaching the suspension part to a wall; and hanging a door leaf on the suspension part in such a manner that a carriage attached to the door leaf bears on the running surface.

The suspension part comprises at least one lower support element and at least one upper support element. The component part comprises at least one hanging element by way of which the component part, subsequently to the hanging of the door leaf on the suspension part, is hung on the suspension part in such a manner that the hanging element is supported toward the bottom by the lower support element in a first support point and toward the top by the upper support element in a second support point, wherein the first support point is disposed so as to be spaced apart between the second support point and the center of gravity of the component part.

When the door leaf is hung on the suspension part, the latter is preferably already attached to the wall.

Prior to hanging to the component part on the suspension part, a drive motor and/or other components are preferably attached to the component part. However, the drive motor and/or the other components can also be attached to the component part only once the latter has already been hung on the suspension part, as the case may be.

After the hanging of the component part on the suspension part, the component part is preferably secured on the suspension part by means of a securing element, which can be achieved by screwing the two parts to one another, for example.

It is moreover preferable, once the component part has been hung on the suspension part, that a drive motor attached to the component part is connected to the door leaf by means of a force-transmitting element such as, for example, a drive belt.

BRIEF DESCRIPTION OF THE DRAWINGS

Preferred embodiments of the invention are described in the following with reference to the drawings, which merely serve the purpose of providing illustration and should not be interpreted as being limiting. In the drawings.

DESCRIPTION OF PREFERRED EMBODIMENTS

Different suspension assemblies 2 according to the invention of sliding doors 1 are shown in FIGS. 1 to 12. Identical or functionally equivalent elements of the different embodiments are in each case provided with the same reference signs hereunder.

Figure 1:
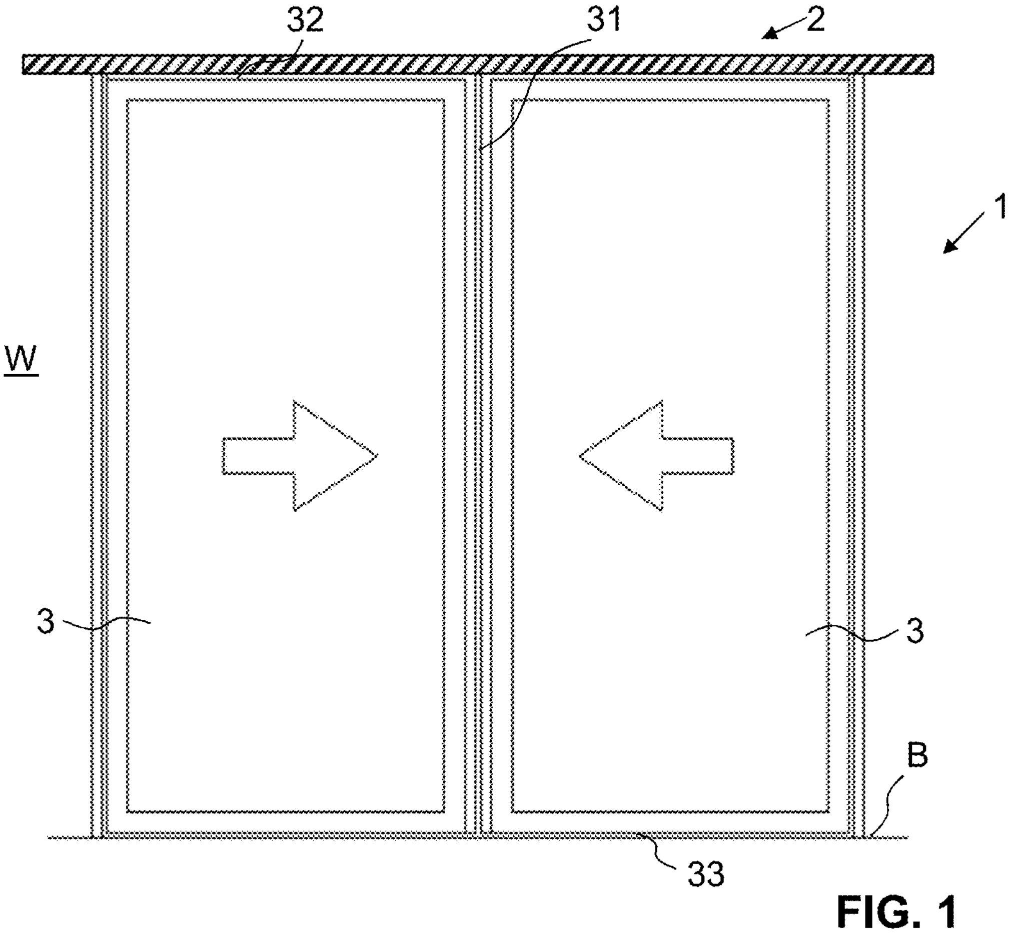
FIG. 1 shows a schematic view of a sliding door having a suspension assembly according to a first embodiment according to the invention, viewed from the front.

FIG. 1 shows a two-leaf sliding door 1 which is assembled according to the intended use and has two door leaves 3 which for closing a passage opening provided in a wall W are displaceable along the closing direction marked with arrows. The two door leaves 3 herein are mutually displaceable so far that the two main closing edges 31 of the door leaves 3 come to bear on one another. For opening the sliding door 1, the two door leaves 3 are displaceable away from one another counter to the direction of the arrows. The closing direction herein extends perpendicularly to the direction of passage of the door. Sealing means for mutually sealing the door leaves 3 in the closed state of the sliding door 1 can in each case be provided along the main closing edges 31.

In order to enable displacing of the door leaves 3, the latter are hung so as to be displaceable on the wall W by means of a suspension assembly 2. The suspension assembly 2 is attached to the wall W so as to be stationary above the passage opening. The suspension assembly 2 has a horizontally running direction of longitudinal extent; the suspension assembly 2 extends parallel to the floor B in the longitudinal direction, said floor B delimiting the passage opening to be closed by the sliding door 1 toward the bottom.

The door leaves 3 have in each case an upper closing edge 32. Attached to the latter is/are in each case one or a plurality of carriages 7 which are not visible in FIG. 1 but can be seen in FIGS. 3 and 5, and which serve to hang the respective door leaf 3 on the suspension assembly 2. The lower closing edges 33 of the door leaves 3 run in each case directly along the floor B. First guiding means which for guiding the door leaves 3 interact with a second guiding means provided on the floor B in order to achieve a guided displacement of the door leaves 3 are preferably provided on the lower closing edges 33. The first guiding means can be, for example, one or a plurality of guiding blocks which engage in a guide rail that is provided on the floor B and is open toward the top. The guide rail is preferably sunk into the floor B.

A preferred first embodiment of a suspension assembly 2 according to the invention, as can be used in the sliding door 1 shown in FIG. 1, for example, will now be described by means of FIGS. 2 to 5. The suspension assembly 2 of FIGS. 2 to 5 can however also be used in other sliding doors 1 such as, for example, also in single-leaf sliding doors or in sliding doors with more than two displaceable door leaves 3.

Figure 2:
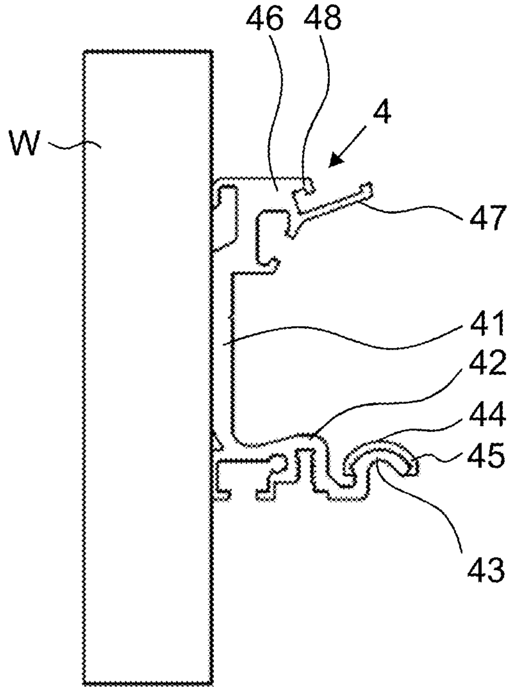
FIG. 2 shows a lateral view of the suspension part of the suspension assembly of FIG. attached to a wall, in a stand-alone view.

For fastening the suspension assembly 2 to the wall W, the suspension assembly has a suspension part 4 which is shown in a stand-alone view in FIG. 2 in the state assembled on the wall W. The suspension part 4 in the present exemplary embodiment is a profiled rail, i.e. the suspension part 4 has a consistent cross section in terms of area and shape along its entire longitudinal extent. The cross section of the suspension part 4 can be readily seen in FIG. 2, the latter showing the frontal end of the profiled rail.

As can be seen in FIG. 2, the suspension part 4 has a wall portion 41 which runs vertically in the cross-sectional view and by way of which the suspension part 4 bears on the wall W. Fastening means such as, for example, bores or depressions provided with rearward engagement elements, are formed on the wall portion 41 so as to fasten the suspension part 4 to the wall W and in particular anchor said suspension part in the latter.

A door leaf portion 42 extends from the wall portion 41, at the lower end of the latter in the cross-sectional view, so as to be approximately perpendicular from the wall W toward the front in the direction of passage. The door leaf portion 42 serves to hold and in particular hang the door leaf, or door leaves, 3. The door leaf portion 42 for this purpose has a free end which forms a bearing element 43 which serves to bear the carriage, or carriages, 7 attached to the door leaves 3. The bearing element 43 here is covered with a covering 45 which forms a running surface 44. The carriage, or carriages, 7 in the state assembled according to the intended use, bear on the running surface 44, which here is curved convexly toward the top, in such a manner that said carriages 7 are displaceable along the running surface 44 in the longitudinal direction of the suspension part 4.

As in the present exemplary embodiment, depressions, guide rails, threaded bores, etc., for attaching various construction elements of the sliding door to the suspension part 4, such as sealing means or sensors, can be formed on the lower side of the door leaf portion 42.

A component portion 46 extends from the upper end of the wall portion 41 in the cross-sectional view of FIG. 2 so as to be approximately perpendicular from the wall W toward the front in the direction of passage. The component portion 46 has a free end which extends so as to be slightly inclined upward and forms a lower support element 47. As can be readily seen in FIG. 2, the lower support element 47 does not extend as far outward in the horizontal direction as the running surface 44. As a result, the space is clear for hanging a door leaf on the running surface 44, without the lower support element 47 getting in the way of the door leaf and in particular a carriage attached to the latter. Above the point from which the lower support element 47 extends so as to be inclined upward, the component portion 46 forms an upper support element 48 in the form of a projection which extends perpendicularly outward in terms of the wall W. However, the upper support element 48 is designed to be significantly shorter than the lower support element 47. The two support elements 47 and 48 have in each case a hook-shaped termination on their free end. In the lower support element 47, the hook extends upward, and downward in the upper support element 48. The component portion 46 by way of the two support elements 47 and 48 serves to hold a component part 5 (see FIGS. 4 and 5) to which are attached a drive motor 61 and further mechanical or electrical components.

Owing to the component portion 46, the wall portion 41 and the door leaf portion 42, the suspension part 4 has a C-shape design in the cross-sectional view.

Figure 3:
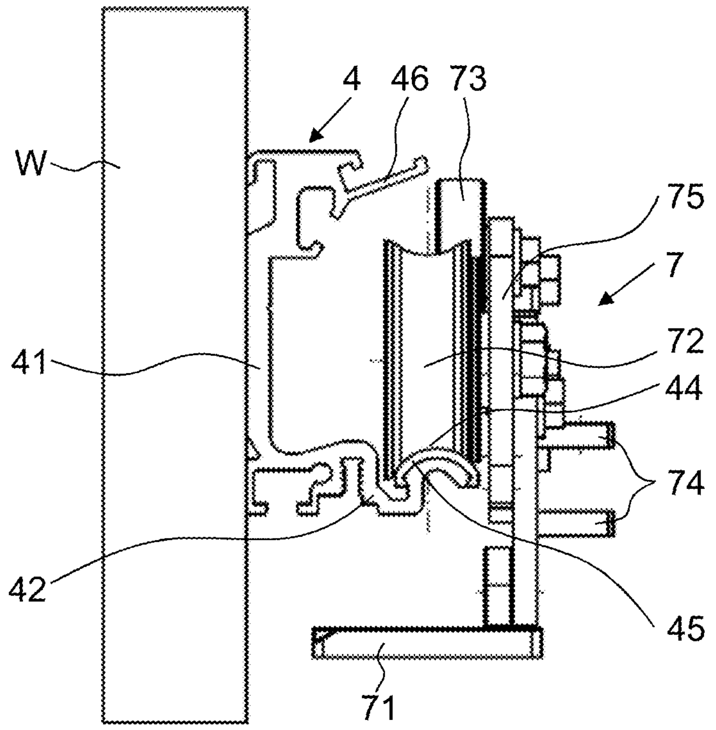
FIG. 3 shows a lateral view of the suspension part of the suspension assembly of FIG. 5 attached to a wall, having a carriage hung on said suspension part.

FIG. 3 shows the same suspension part 4 attached to the wall W as in FIG. 2, but having a carriage 7 hung thereon. The carriage 7 comprises at least one roller and 72 by way of which the carriage 7 bears on the running surface 44 of the suspension part 4. The roller 72 has a concavely designed radial external face which is designed to be complementary to the running surface 44 which is convexly curved upward. The carriage 7 is guided by this when displaced along the running surface 44. Owing to the covering 45, which however also could be dispensed with in other embodiments, the rolling of the roller(s) 72 on the running surface 44 is performed in a particularly noise-reduced manner. The covering 45 is preferably produced from a plastics material.

The roller, or rollers, 72 is/are attached to a main support part 75 of the carriage 7 so as to be freely rotatable thereon, said main support part 75 running vertically in the cross-sectional view. A connecting element 71 which serves to fasten a door leaf 3 is attached to the lower end of the main support part 75. The connecting element 71 is usually attached to the upper closing edge 32 of the door leaf 3. For reasons of visualization, the door leaf 3 is not shown in FIGS. 3 and 5. The main support part 75 is advantageously adjustable in its height so that the spacing between the roller 72 and the connecting element 71 can be adjusted within specific limits.

Figure 5:
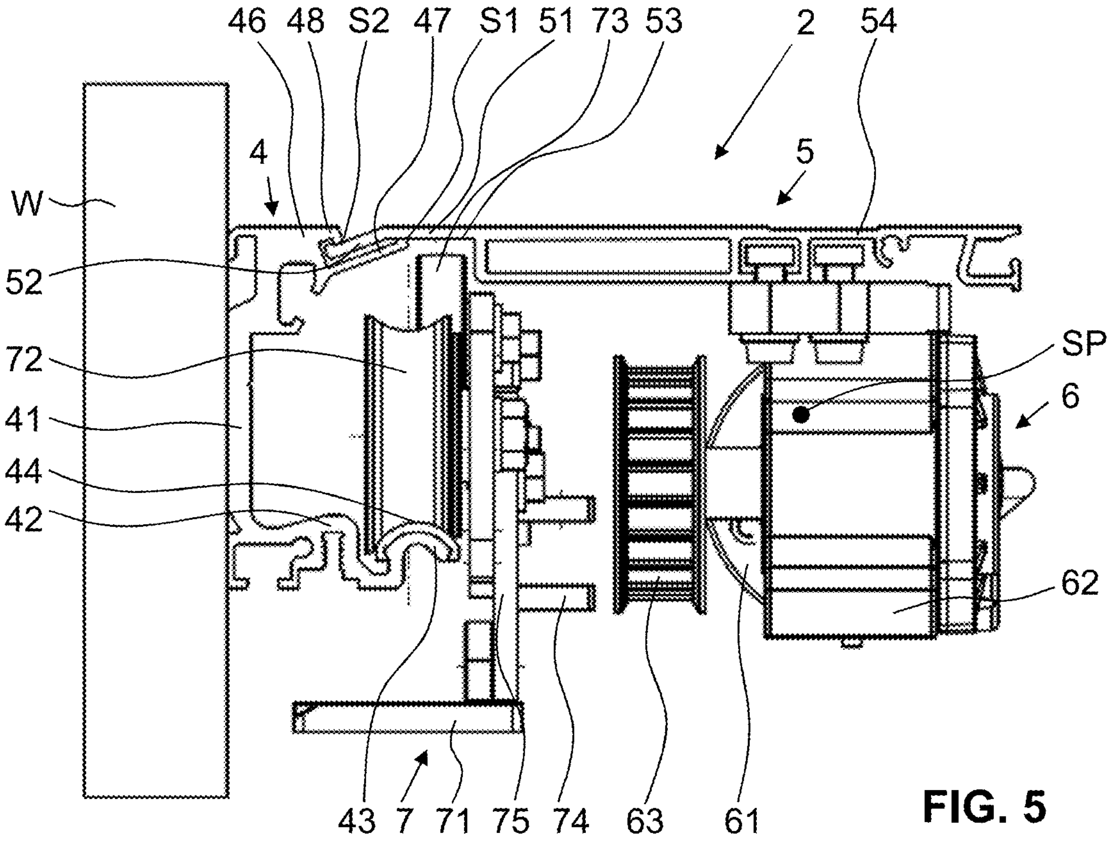
FIG. 5 shows a lateral view of a suspension assembly according to a first embodiment according to the invention, attached to a wall and assembled according to the intended use, having a carriage hung on the suspension part and a drive attached to the component part.

Moreover, a counterpressure roller 73 is attached so as to be freely rotatable on the main support part 75 of the carriage 7. The counterpressure roller 73, the function thereof being explained further below with reference to FIG. 5, is disposed on the same side of the main support part 75 as the roller 72. However, said counterpressure roller 73 is positioned so as to be somewhat offset from the suspension part 4, as can be readily seen in the view of FIG. 3. Moreover, the counterpressure roller 73 is disposed somewhat higher than the roller 72 on the main support part 75.

Dogs 74 are attached to the main support part 75 on that side of the main support part 75 that lies opposite the roller 72 and the counterpressure roller 73, thus on the side facing away from the suspension part 4, said dogs 74 extending perpendicularly outward from said main support part 75. In the state assembled according to the intended use, the dogs 74 interact with a force-transmitting element such as, for example, a drive belt, the latter being connected to a drive motor, in order for the displacement of the door leaves 3 to be automated.

Figure 4:
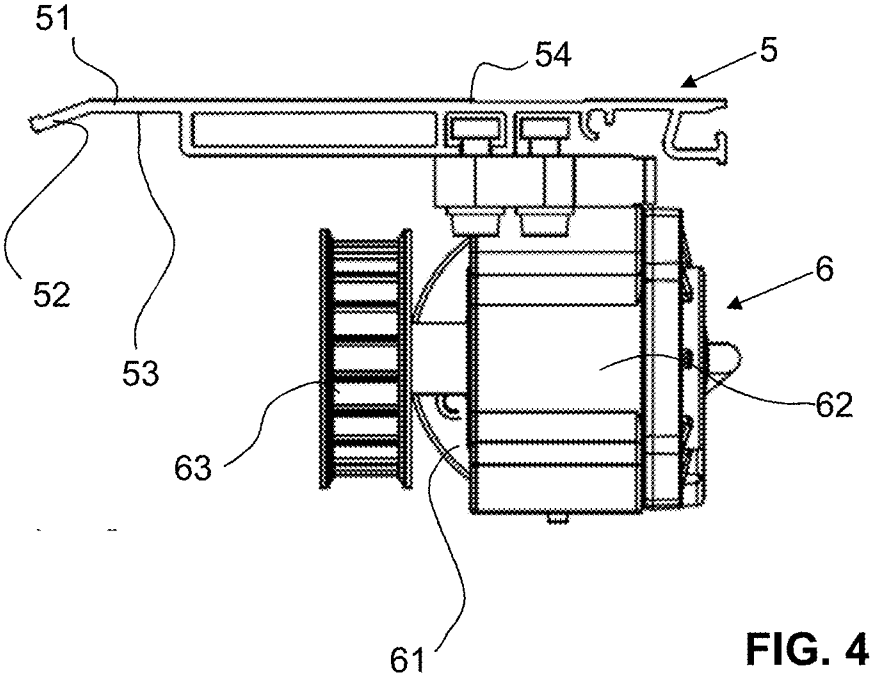
FIG. 4 shows a lateral view of the component part of the suspension assembly of FIG. 5 in a stand-along view; having a drive attached to said component part.

The component part 5 having the drive 6 attached thereto is shown in FIG. 4. FIG. 4 shows a lateral view onto an end face of the component part 5 which is designed as a profiled rail.

The component part 5 has a connecting portion 51 which during assembling of the suspension assembly serves to hang the component part 5 in the suspension part 4. The connecting portion 51 extends approximately along the horizontal direction and, in the state assembled according to the intended use, toward the suspension part 4. Said connecting portion 51 has a free end which extends so as to be slightly inclined downward toward the suspension part 4 and forms a hanging element 52. The hanging element 52 on the outer end forms a hook-shaped termination, whereby the hook extends slightly upward. Moreover, the connecting portion 51 on its lower side forms a flat counter running surface 53 which serves for bearing and rolling on the counterpressure rollers 73 attached to the carriage 7.

The connecting portion 51, on its side that faces away from the suspension part 4, transitions into an assembly portion 54 which extends outward along the horizontal direction. Various mounting elements such as, for example, bores, rearward engagement elements, assembly rails, etc., are formed on the lower side of the assembly portion 54. These mounting elements serve to attach the most varied components to the suspension assembly 2, such as in particular the drive 6. However, arbitrary further components can also be attached to the assembly portion 54 such as, for example, control elements, sensors, a mains supply unit, a travel detection unit and/or a transmission unit for communicating wirelessly or by wire with an external device.

The drive 6 shown in FIG. 4 has a drive motor 61 and an angle gearbox 62 connected thereto. A drive wheel 63 which serves to drive a drive belt not illustrated in the figures is attached to the gearbox 62 by way of a shaft. In the state assembled according to the intended use, the dogs 74 attached to the carriage, or carriages, 7 bear in each case on an element of the drive belt which runs horizontally along the upper closing edge 32, and as a result are entrained by the drive belt in a movement of the latter, as a result of which the sliding door 1 opens or closes, respectively. All of the components of the drive 6 are attached to the assembly portion 54 of the component part 5 from below, for example screwed thereto.

The assembled state according to the intended use of the suspension assembly 2 is shown in FIG. 5: The component part 5 by way of its hanging element 52 is hung on the component portion 46 of the suspension part 4 which is attached above the door passage opening on the wall W. The hanging element 52 of the component part 5 herein protrudes into the intermediate space which is formed by the lower support element 47 and by the upper support element 48. Because the lower support element 47 extends slightly upward toward its free end, and the hanging element 52 extends slightly downward toward its free end, the lower support element 47 and the hanging element 52 run parallel to one another in the hung state, as can be seen in FIG. 5.

As can moreover be seen in FIG. 5, the component part 4 in the hung state is supported from below by the lower support part 47 in a first support point S1, on the one hand, and supported from above by the upper support part 48 in a second support point S2, on the other hand. The center of gravity SP of the unit including the component part 4, the drive motor 61 and the further components, thus in particular the gearbox 62 and the drive wheel 63, lies approximately at the location indicated in FIG. 5 and is thus significantly spaced apart from the first support point S1 in the horizontal direction toward the outside. In this way, the first support point S1 is disposed so as to be spaced apart along the horizontal direction between the second support point S2 and the center of gravity SP of the component part 5 including the components 61, 62, 63 attached to the latter.

The component part 5 is thus supported from below by means of the lower support part 47 in the first support point S1. Due to gravity, the component part 5 is pulled toward the floor B in the center of gravity SP. However, this force acting toward the floor B is absorbed on the side lying opposite the first support point S1 by the upper support element 48 in the second support point S2, as a result of which the component part 5 has an overall stable position.

An inadvertent extraction of the hanging element 52 of the component part 5 from the component portion 46 of the suspension part is prevented by the two hooks which hook into one another and are formed on the respective free ends of the upper support element 48 and of the hanging element 52. Once the component part 5 has been hung on the suspension part 4 it is however advisable to fasten the two parts to one another by means of a securing element for safety reasons. For this purpose, the component part 5 and the suspension part 4 can in particular be screwed to one another at suitable locations.

As can moreover be seen in FIG. 5, the counterpressure roller 72, which is attached to the carriage 7, is disposed directly below the counter running surface 53 or even bears on the latter in the hung state of the component part 5. As a result, it can be prevented that the door leaf 3 attached to the carriage 7 pivots along the direction of passage. The counterpressure roller 72, which in other embodiments can also be designed as a counterpressure sliding element, as a result prevents in particular also that the door leaf 3 can be detached from the suspension part 4 in the completely assembled state of the sliding door 1.

The method for assembling a sliding door 1 having a suspension assembly designed according to FIGS. 2 to 5 is derived from the sequence of FIGS. 2 to 5:

In a first step, the suspension part 4 is fastened to a wall W above a passage opening (FIG. 2). In a second step, one or a plurality of door leaves 3 are hung on the suspension part 4 (FIG. 3). For this purpose, the carriage, or carriages, 7 attached to the door leaf 3 are placed on the running surface 44 of the suspension part 4 by way of the rollers 72 of said carriages 7. Because the component part 5 is in this instance not yet attached to the suspension part 4, and the space above the running surface 44 is clear for this reason, hanging the door leaf, or door leaves, 3 on the suspension part 4 is performed in a particularly simple manner. During hanging, space is in particular also available in the region of the counterpressure roller(s) 73. As a next step, the component part 5 to which the drive motor 61 and the further components 62, 63 are preferably already attached (FIG. 4) is then hung on the suspension part 4 (FIG. 5). For this purpose, the component part 5, with the hanging element 52 in front, has to be simply introduced into the space between the two support elements 47 and 48 of the component portion 46. Owing to the design of the hanging element 52 on the one hand, and of the upper support element 47 on the other hand, the hanging element 52 for this purpose can simply be placed on the lower support element 47 and subsequently be advanced obliquely downward along the latter up to the detent. As a result, the component part 5 is hung on the suspension part 4 in a stable position. For safety reasons, it is advisable to then also secure the component part 5 on the suspension part 4 with the aid of one or a plurality of securing elements 55. As a last step, a drive belt can then also be attached to the drive wheel 63 so as to connect the latter to the dogs 74 of the carriage, or carriages, 7.

The component part 5 on its outer end facing away from the suspension part 4 can have one or a plurality of connecting structures so as to enable a cover element, for example in the form of a sheet-metal cover plate, to be attached. The sheet-metal cover plate, or cover plates, can be attached to the component part 5 at the end of the assembling method, i.e. once the drive wheel 63 has been connected to the dogs 74 by way of a force-transmitting element.

Figure 6:
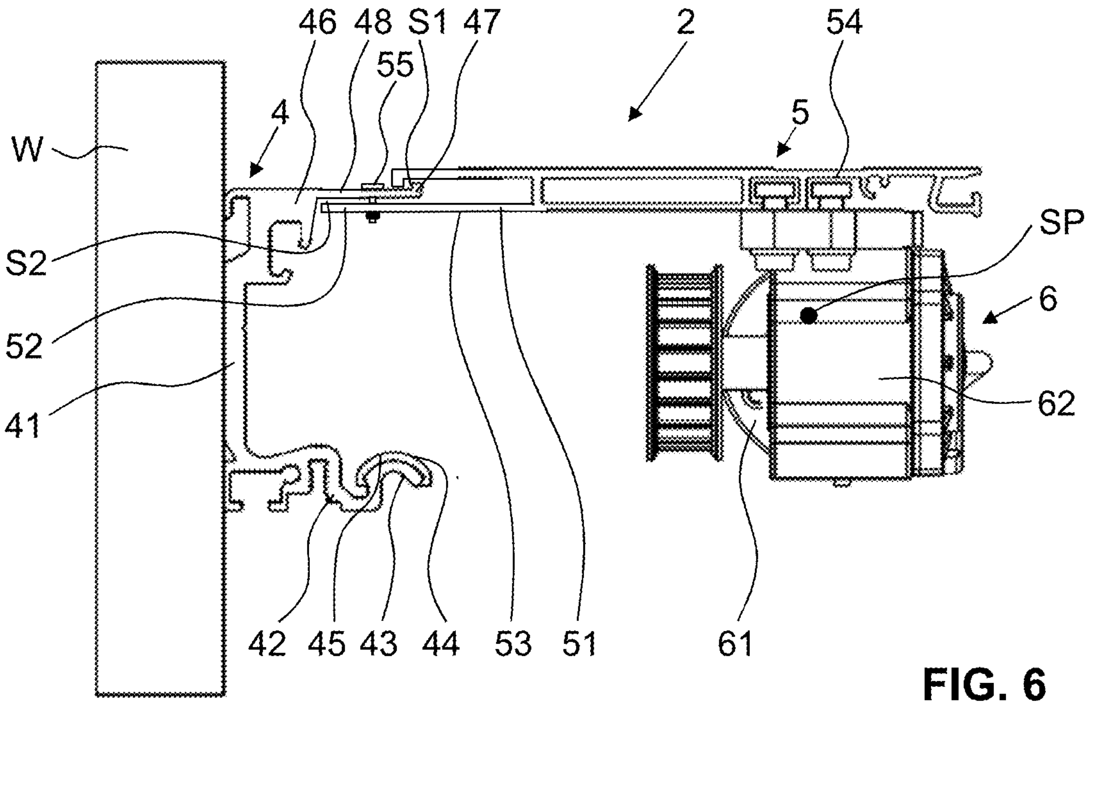
FIG. 6 shows a lateral view of a suspension assembly according to a second embodiment according to the invention, attached to a wall and assembled according to the intended use, having a carriage hung on the suspension part and a drive attached to the component part.

Shown in FIG. 6 is a suspension assembly according to another embodiment which however is also according to the invention. The embodiment of FIG. 6 differs from that of FIGS. 2 to 5 only in the design embodiment of the component portion 46 of the suspension part 4 and of the connecting portion 51 of the component part 5.

In the embodiment of FIG. 6, the component portion 46 of the suspension part 4 is formed by a simple web which extends perpendicular toward the outside from the wall W and on its free end has a slightly upward protruding projection and forms a hook-shaped termination as a result.

The hanging element 52 of the connecting portion 51 is formed conjointly by two horizontal webs that extend so as to be mutually parallel, whereby the lower web extends somewhat farther toward the suspension part 4 than the upper web. The upper web on its free end has a slightly downward protruding projection and forms a hook-shaped termination as a result.

For hanging the component part 5, the latter is hung on the suspension part 4 in such a manner, as is shown in FIG. 6, that the horizontally protruding web of the component portion 46 is pushed into the intermediate space which is delimited by the two parallel webs of the hanging element 52 of the connecting portion 51. The free end of the web formed by the component portion 46 in the process supports the component part 5 from below in a first support point S1. Somewhat spaced apart therefrom, the component portion 46 simultaneously supports the component part 5 from above in a second support point S2. In this way, the web formed by the component portion 46 simultaneously forms here the lower support element 47 (in the region of its free end) as well as the upper support element 48 (in a region between the free end and the wall portion 41). The positions of the first and of the second support point S1, S2 and of the center of gravity SP of the component part 5 including the drive motor 61 and the further components attached thereto are however similar to those in the embodiment shown in FIG. 5.

Moreover shown in FIG. 6 is a securing element 55 in the form of a screw-and-nut connection between the component part 5 and the suspension part 4.

Figure 7:
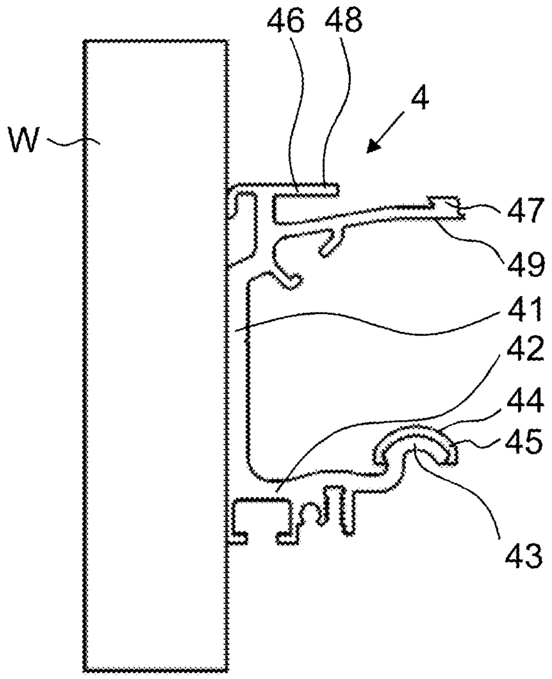
FIG. 7 shows a lateral view of the suspension part of a suspension assembly according to a third embodiment according to the invention, attached to a wall.

A further embodiment of a suspension assembly 2 according to the invention is shown in FIGS. 7 to 12. As can be seen in FIG. 7, the lower support element 47 here extends somewhat farther toward the outside in the direction of the component part 5, but still just not as far as the running surface 44. The lower support element 47 in the region of its free end forms a hook toward the top, said hook on its side that faces away from the component part 5 having an oblique face. The oblique face forms an undercut. In comparison to the embodiment of FIGS. 1 to 5, the lower support element 47 moreover extends, from the wall portion 41, somewhat more in the horizontal direction toward the outside, i.e. the inclination of the lower support element 47 obliquely toward the top is less pronounced here. As a result, the lower support element 47 on its lower side forms a counter running surface 49 which serves for rolling on one or a plurality of counterpressure rollers 73 of the carriage 7. Otherwise, the design of the upper part of the suspension part 4 is very similar to that of the suspension part 4 in FIG. 2.

The lower part of the suspension part 4 of FIG. 7, having the door leaf portion 42 and the bearing element 42, is likewise designed to be very similar to the lower part of the suspension part 4 of FIG. 2. In comparison to the embodiment of FIG. 2, the bearing element 43 and thus the running surface 44 are disposed to be somewhat higher above.

Figure 8:
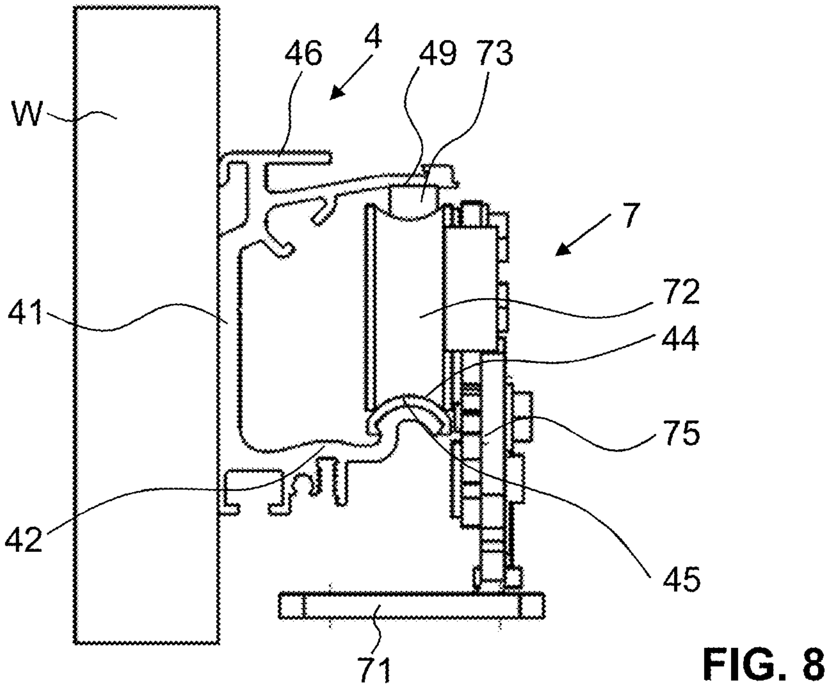
FIG. 8 shows a lateral view of the suspension part of FIG. 7, attached to the wall and having a carriage hung thereon.

The carriage 7, which can be seen in FIG. 8, differs from that of FIG. 3 in particular in that the counterpressure roller 73 here is disposed so as to be offset somewhat farther to the inside, i.e. toward the roller 72. As a result, the counterpressure roller 73 bears on the counter running surface 49, or rolls on the latter, respectively, which herein is formed by the suspension part 4 instead of the component part 5, as mentioned. The rolling action of the counterpressure rollers 73 on the suspension part 4 instead of on the component part 5 has the advantage that noise emissions can be reduced as a result.

Figure 9:
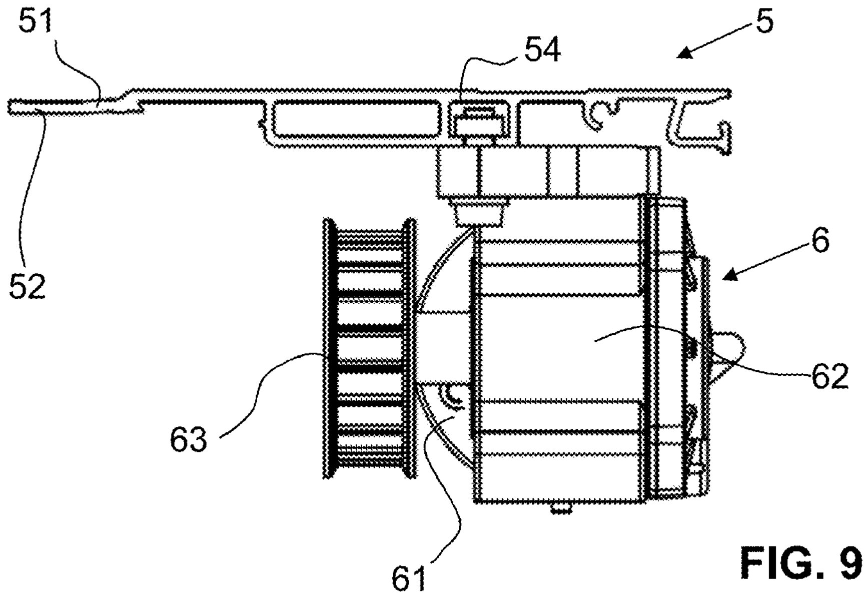
FIG. 9 shows a lateral view of the component part according to the third embodiment according to the invention, in a stand-alone view, having a drive attached thereto.

The component part 5 illustrated in FIG. 9 differs from that of the embodiment of FIGS. 1 to 5 only in the region of the connecting portion 51. The connecting portion 51 has a hanging element 52 that runs horizontally here and has a lower bearing face which on the side facing away from the suspension part 4 is delimited by an oblique face. The oblique face, which forms an undercut, extends from the lower bearing space toward the top at an acute angle.

Figure 10:
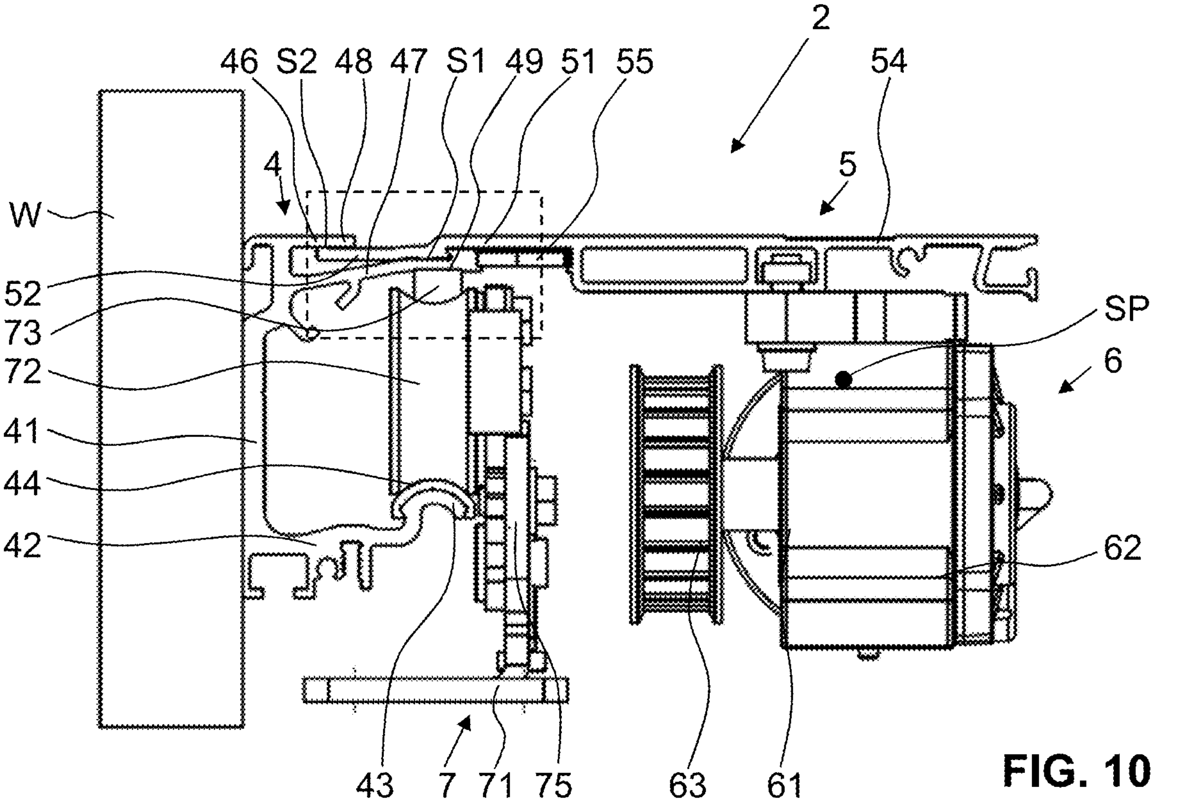
FIG. 10 shows a lateral view of a suspension assembly according to a third embodiment according to the invention, attached to a wall and assembled according to the intended use, having a carriage hung on the suspension part and a drive attached to the component part.

FIG. 10 shows the component part 5 hung on the suspension part 4 and secured on the latter in a suspension assembly 2 assembled according to the intended use. The component part 5 by way of its hanging element 52 bears on the lower support element 47 of the suspension part 4, and is supported by the latter from below in a support point S1. As can be seen in the detailed view of FIG. 11, the hanging element 52 (as here) and/or the lower support element 47 can in each case have a local elevation, e.g. in the form of a material thickening, in the region of the support point S1, so as to define the position of the support point S2. The hanging element 52, by way of its free end, bears on the upper support element 48 from below, the latter supporting the hanging element 52 from above in a further support point S2, i.e. absorbing part of the weight of the component part 5 including the components attached thereto. As can moreover be seen in FIG. 10 and in particular in FIG. 11, the lower support element 47 and the hanging element 52 herein are hooked into one another in the region above the counter running surface 49, i.e. the two oblique faces formed by the lower support element 47 and by the hanging element 52 bear on one another.

Figure 11:
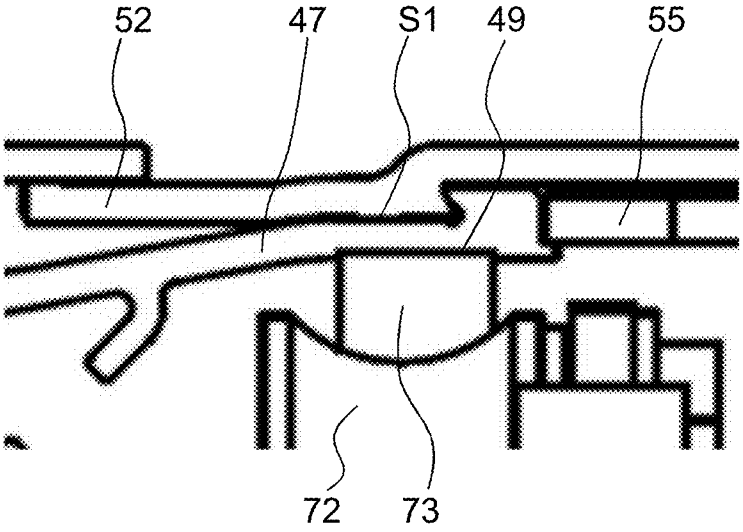
FIG. 11 shows an enlarged detailed view of the region bordered by dashed lines in FIG. 10.
Figure 12:
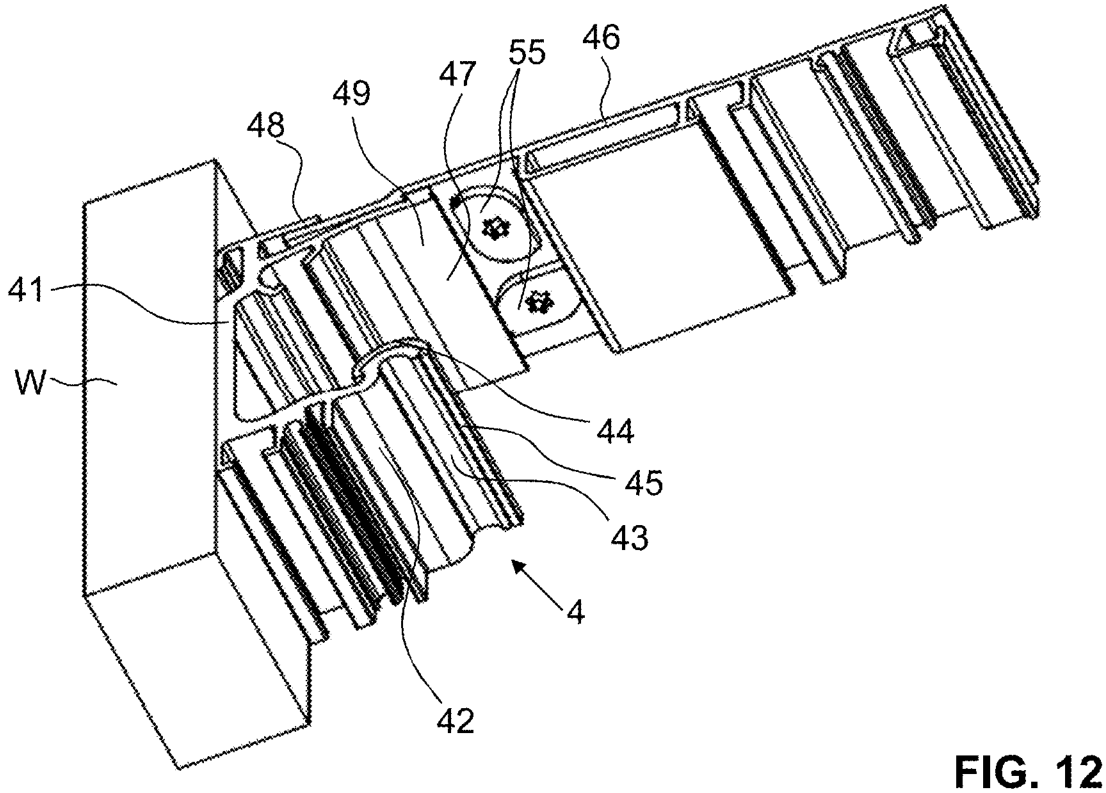
FIG. 12 shows a perspective view from obliquely below of the suspension part of FIG. 7 attached to the wall, having the component part of FIG. 9 hung thereon and braced therewith.

Securing the component part 5 on the suspension part 4 can be seen when viewing FIGS. 10 to 12 in combination. One or a plurality of securing elements 55, which here are formed by loose groove blocks, serve this purpose. The securing elements 55 here are in each case disposed on the lower side of the component part 5, between the lower support element 47 of the suspension part 4 and a face of the component part 5 that extends perpendicularly downward. As a result, the groove blocks are thus disposed between the suspension part 4 and the component part 5. The positioning of the groove blocks on the lower side of the component part 5 makes it particularly easy for a technician to attach said groove blocks to the suspension assembly 2, and to subsequently activate them for securing even when a door leaf 3 and the drive 6 and further components have already been attached to the suspension assembly.

The securing elements 55, which are designed as groove blocks and can be readily seen in particular in FIG. 12, have an overall flat shape, and on their lower side have an engagement structure in the form of a Torx structure. The Torx structure serves to rotate the groove block by means of a tool, and defines a rotation axis of the groove block. An Allen key structure, a slot structure or any other structure may be provided instead of a Torx structure. The groove blocks have in each case two eccentric external faces disposed on opposite sides of the groove blocks. When the groove block is rotated by means of a tool, the eccentric external faces are in each case pressed increasingly against the suspension part 4, or the component part 5, respectively, as a result of which the oblique face of the hanging element 52 is drawn increasingly toward the oblique face of the lower support element 47 (see FIG. 10). In this way, the component part 5 and the suspension part 4 can be braced in a very simple yet efficient manner with the aid of the groove blocks, and said component part 5 is secured in terms of its position as a result and in particular secured against falling off. The groove blocks thus form bracing elements. Securing by means of groove blocks has proven particularly advantageous in particular when the construction surface, or the wall W, is uneven, which could lead to (minor) deformations of the suspension part 4 during assembling. As opposed to screws, groove blocks moreover have the advantage that the latter can be used at arbitrary locations and in arbitrary numbers along the profiled rails 4, 5.

In order to prevent the securing elements 55, or the groove blocks, from falling down when they have not yet been fully tightened, the groove blocks bear in each case peripherally on horizontal holding webs of the suspension part 4 and of the component part 5. If the grooves are correspondingly sized, the groove blocks in the untightened state can in this way even be held firmly on the suspension assembly 2 to some extent.

It goes without saying that the above invention is not limited to the present embodiments, and a multiplicity of variants are possible. In this way, the suspension part and the component part may also have other cross-sectional shapes, for example, and do not even have to be designed mandatorily as profiled rails. Instead of the drive, other components of the sliding door can also be attached to the component part. The drive 6 in this instance could be attached to another support part, or else for example directly to the suspension part, or be disposed at another location, for example in the region of the lower closing edge 33. A multiplicity of further variants are possible.

The invention claimed is:

1. A suspension assembly for at least one door leaf of a sliding door, comprising:

a suspension part which comprises a running surface on which a carriage attached to the door leaf bears and on which the carriage rolls or slides in order to displace the door leaf; and a component part which is attached or configured to be attached to the suspension part and which serves to hold at least one of an electrical or a mechanical component;

wherein the suspension part comprises at least one lower support element and at least one upper support element;

wherein the component part comprises at least one hanging element by way of which the component part is able to be hung on the suspension part in such a manner that the hanging element is supported in a downward direction by the lower support element in a first support point and in an upward direction by the upper support element in a second support point;

wherein the first support point is at a distance between the second support point and the center of gravity defined by a weight distribution of the component part and the attached at least one of the electrical or the mechanical component; and wherein the lower support element extends out towards the component part less than, or at most as far as, the running surface.

2. The suspension assembly as claimed in claim 1, wherein at least one of the suspension part or the component part is designed as a profiled rail.

3. The suspension assembly as claimed in claim 1, wherein the upper support element is disposed above the running surface.

4. The suspension assembly as claimed in claim 3, wherein also the lower support element is disposed above the running surface.

5. The suspension assembly as claimed in claim 1, wherein the component part has a counter running surface which serves to bear a counterpressure element attached to the door leaf.

6. The suspension assembly as claimed in claim 5, wherein the counterpressure element is a counterpressure roller.

7. The suspension assembly as claimed in claim 1, further comprising a securing element for securing the component part on the suspension part.

8. The suspension assembly as claimed in claim 7, wherein the securing element is at least one bracing element which is disposed between the suspension part and the component part and is designed to mutually brace the suspension part and the component part.

9. The suspension assembly as claimed in claim 8, wherein the bracing element comprises at least one eccentrically running surface which, by means of rotating the bracing element, is able to be pressed increasingly against at least one of the suspension part or the component part.

10. The suspension assembly as claimed in claim 8, wherein the bracing element by means of rotation is able to be pressed simultaneously against the suspension part and against the component part.

11. The suspension assembly as claimed in claim 8, wherein the bracing element is a groove block which is held in a groove of at least one of the suspension part or the component part.

12. The suspension assembly as claimed in claim 1, wherein the second support point is disposed at the same height as, or below, the first support point.

13. The suspension assembly as claimed in claim 1, wherein the lower support element extends slightly inclined upwards towards the component part.

14. The suspension assembly as claimed in claim 1, wherein the hanging element and the upper support element each forms a hook designed to hook into one another to secure a connection between the suspension part and the component part.

15. A sliding door having at least one door leaf and the suspension assembly as claimed in claim 1 for hanging the door leaf on a wall.

16. A method for assembling a sliding door with a suspension assembly which comprises a suspension part having a running surface and a component part, wherein the method comprises at least the following steps:

attaching the suspension part to a wall; and hanging a door leaf on the suspension part in such a manner that a carriage attached to the door leaf bears on the running surface, wherein the suspension part comprises at least one lower support element and at least one upper support element, and wherein the component part comprises at least one hanging element by way of which the component part, subsequently to the hanging of the door leaf on the suspension part, is hung on the suspension part in such a manner that the hanging element is supported in a downward direction by the lower support element in a first support point and in an upward direction by the upper support element in a second support point, wherein the first support point is arranged at a distance between the second support point and the center of gravity defined by a weight distribution of the component part and an attached at least one of an electrical or a mechanical component, and wherein the lower support element extends out towards the component part less than, or at most as far as, the running surface.

17. The method as claimed in claim 16, wherein prior to hanging the component part on the suspension part, at least one of the electrical or the mechanical component is attached to the component part.

18. The method as claimed in claim 16, wherein after hanging the component part on the suspension part, a drive motor attached to the component part is connected to the door leaf by means of a force-transmitting element.

19. A suspension assembly for at least one door leaf of a sliding door, comprising:

a suspension part which comprises a running surface on which a carriage attached to the door leaf can bear and on which the carriage can roll or slide, in order to displace the door leaf; and a component part which is attached or is attachable to the suspension part and which serves to hold at least one of an electrical and a mechanical component, wherein the suspension part comprises at least one lower support element and at least one upper support element, wherein the component part comprises at least one hanging element by way of which the component part is able to be hung on the suspension part in such a manner that the hanging element is supported in a downward direction by the lower support element in a first support point and in an upward direction by the upper support element in a second support point, wherein the first support point is arranged at a distance between the second support point and the center of gravity defined by a weight distribution of the component part and the attached at least one of an electrical and a mechanical component, and wherein the component part has a counter running surface which serves to bear a counterpressure roller attached to the door leaf.

* * * * *